(12) United States Patent
Dutta et al.

(10) Patent No.: US 11,675,760 B2
(45) Date of Patent: Jun. 13, 2023

(54) DETECTION OF DUPLICATE VALUES DURING INDEX GENERATION

(71) Applicant: salesforce.com, inc., San Francisco, CA (US)

(72) Inventors: Arup Kumar Dutta, San Ramon, CA (US); Jesse Collins, Oakland, CA (US)

(73) Assignee: Salesforce, Inc., San Francisco, CA (US)

( * ) Notice: Subject to any disclaimer, the term of this patent is extended or adjusted under 35 U.S.C. 154(b) by 325 days.

(21) Appl. No.: 15/419,358

(22) Filed: Jan. 30, 2017

(65) Prior Publication Data

US 2018/0218020 A1 Aug. 2, 2018

(51) Int. Cl.
*G06F 16/22* (2019.01)
(52) U.S. Cl.
CPC .................... *G06F 16/22* (2019.01)
(58) Field of Classification Search
CPC ............. G06F 16/1748; G06F 16/215; G06F 16/2365; G06F 11/1453; G06F 3/0641
USPC ........................................................ 707/692
See application file for complete search history.

(56) References Cited

U.S. PATENT DOCUMENTS

| 5,937,401 A | 8/1999 | Hillegas |
| 6,230,158 B1 | 5/2001 | Burrows |
| 6,374,256 B1 | 4/2002 | Ng et al. |
| 6,745,194 B2 | 6/2004 | Burrows |
| 8,346,731 B1 | 1/2013 | Tsaur et al. |
| 8,630,996 B2 | 1/2014 | Bilotti |
| 8,756,207 B2 | 6/2014 | Rineer |
| 2011/0202744 A1* | 8/2011 | Kulkarni ............. G06F 12/1018 711/216 |
| 2011/0246741 A1* | 10/2011 | Raymond ............. G06F 16/137 711/170 |
| 2013/0339314 A1* | 12/2013 | Carpentier ............ G06F 3/0641 707/E17.005 |

(Continued)

OTHER PUBLICATIONS

Nick Boutelier, "Very fast 100 million row database tables," Posted 9 years ago; https://www.isidewith.com/tech-blog/149349331-very-fast-100-million-row-database-tables; 2 pages. [Retrieved Mar. 21, 2022].

(Continued)

*Primary Examiner* — Hosain T Alam
*Assistant Examiner* — Nicholas E Allen
(74) *Attorney, Agent, or Firm* — Kowert, Hood, Munyon, Rankin & Goetzel, P.C.; Mark D. Seegers; Dean M. Munyon

(57) ABSTRACT

Techniques are disclosed relating to creating an index for a database system. In one embodiment, a database system stores data within a plurality of fields in a data table, a subset of the data being associated with a particular one of the plurality of fields. The database system receives a request to index the data table based on the particular field and analyzes the subset of the data. In response to determining, based on the analyzing, that one or more duplicate values are present in the subset of data, the database system sets, in an index table having the particular field, an indication identifying which entries of the index table have a duplicate value for the particular field, and returns a response to the request that specifies the one or more duplicate values. In some embodiments, the response includes a user interface displaying one or more duplicates values.

15 Claims, 9 Drawing Sheets

(56) References Cited

U.S. PATENT DOCUMENTS

| | | | | |
|---|---|---|---|---|
| 2014/0101117 A1* | 4/2014 | Uzzaman | .............. | G06F 16/122 |
| | | | | 707/694 |
| 2015/0199367 A1* | 7/2015 | Hammer | ............... | G06F 16/125 |
| | | | | 707/654 |
| 2015/0379430 A1* | 12/2015 | Dirac | ...................... | G06N 20/00 |
| | | | | 706/12 |
| 2016/0139997 A1* | 5/2016 | Quiane Ruiz | ....... | G06F 11/1453 |
| | | | | 707/692 |
| 2016/0253350 A1* | 9/2016 | Moulik | ............... | G06F 16/2365 |
| | | | | 707/694 |
| 2016/0350440 A1* | 12/2016 | Vaishnav | .......... | G06F 16/90335 |
| 2016/0378832 A1* | 12/2016 | Zhuge | ...................... | G06F 7/22 |
| | | | | 707/752 |
| 2017/0262586 A1* | 9/2017 | Bess | ....................... | G06F 16/22 |

OTHER PUBLICATIONS

Tim Miller, "How Does Indexing Work," 2021 CHARITO, Data Tutorials; https://chartio.com/learn/databases/how-does-indexing-work/; 5 pages. [Retrieved Mar. 21, 2022].

* cited by examiner

Fig. 2A

Data Table 120

| Customers | | |
|---|---|---|
| First Name | Last Name | Email |
| Alex | Smith | asmith@example.com |
| John | White | jwhite@example.com |
| Aaron | Smith | asmith@example.com |

Fields 220

210A Record
210B
210C

Fig. 2B

Data Table 120

| Customer | | | | | |
|---|---|---|---|---|---|
| Organization ID | Key Prefix | Row ID | Value 0 | Value 1 | Value 2 |
| DxxoooIGF | 200 | 200xxooo4GVQ | Alex | Smith | asmith@example.com |
| DxxoooIGF | 200 | 200xxooo4GVU | John | White | jwhite@example.com |
| DxxoooIGF | 200 | 200xxooo4GWO | Aaron | Smith | asmith@example.com |

221  222  223  224A  224B  224C

220 Fields

210D Record
210E
210F

| Organization-ID | Key Prefix | Row ID | Index Value | |
|---|---|---|---|---|
| DxxoooIGF | 200 | 200xxooo4GVQ | asmith@example.com | 1 |
| DxxoooIGF | 200 | 200xxooo4GWO | jwhite@example.com | 0 |
| DxxoooIGF | 200 | 200xxooo4GVU | asmith@example.com | 0 |

Index Table 130
Duplicate Flag Field 135
Fields 220
Records 210

*Fig. 3*

DETECTION OF DUPLICATE VALUES DURING INDEX GENERATION

BACKGROUND

Technical Field

This disclosure relates generally to database systems, and, more specifically, to indexing data in a database system.

Description of the Related Art

Modern database systems typically implement a management system that allows a user to store a collection of information in an organized manner that may be efficiently accessed. Such systems often store information in data tables composed of columns and rows in which each column defines a grouping of the information. As an example, a user may wish to store information about their customers such as a name, a phone number, and an email address. In such an example, a table may be created that has a column for each piece of information (e.g., a column for names, a column for phone numbers, and so on). When information is inserted into the data table for a customer, an additional row may be added to the data table where each piece of information for the customer falls under the corresponding column.

As rows are added to a data table, the time needed to search each row in the data table for a particular customer increases, as these rows may not be sorted. Accordingly, modern database systems often allow an index to be created using one of the columns of a data table. Such an index may include a series of values for the column and pointers to the corresponding rows in the data table. As an example, an index may be created for a names column that stores several names and pointers to the rows of the data table where a record corresponding to a given name may be found. Modern database systems often sort these indexes in a manner that allows them to be quickly and efficiently searched.

BRIEF DESCRIPTION OF THE DRAWINGS

FIG. 2A is a block diagram illustrating an exemplary representation of a data table, according to some embodiments.

FIG. 2B is a block diagram illustrating another exemplary representation of a data table, according to some embodiments.

FIG. 3 is a block diagram illustrating an exemplary representation of an index table, according to some embodiments.

Figure 1:
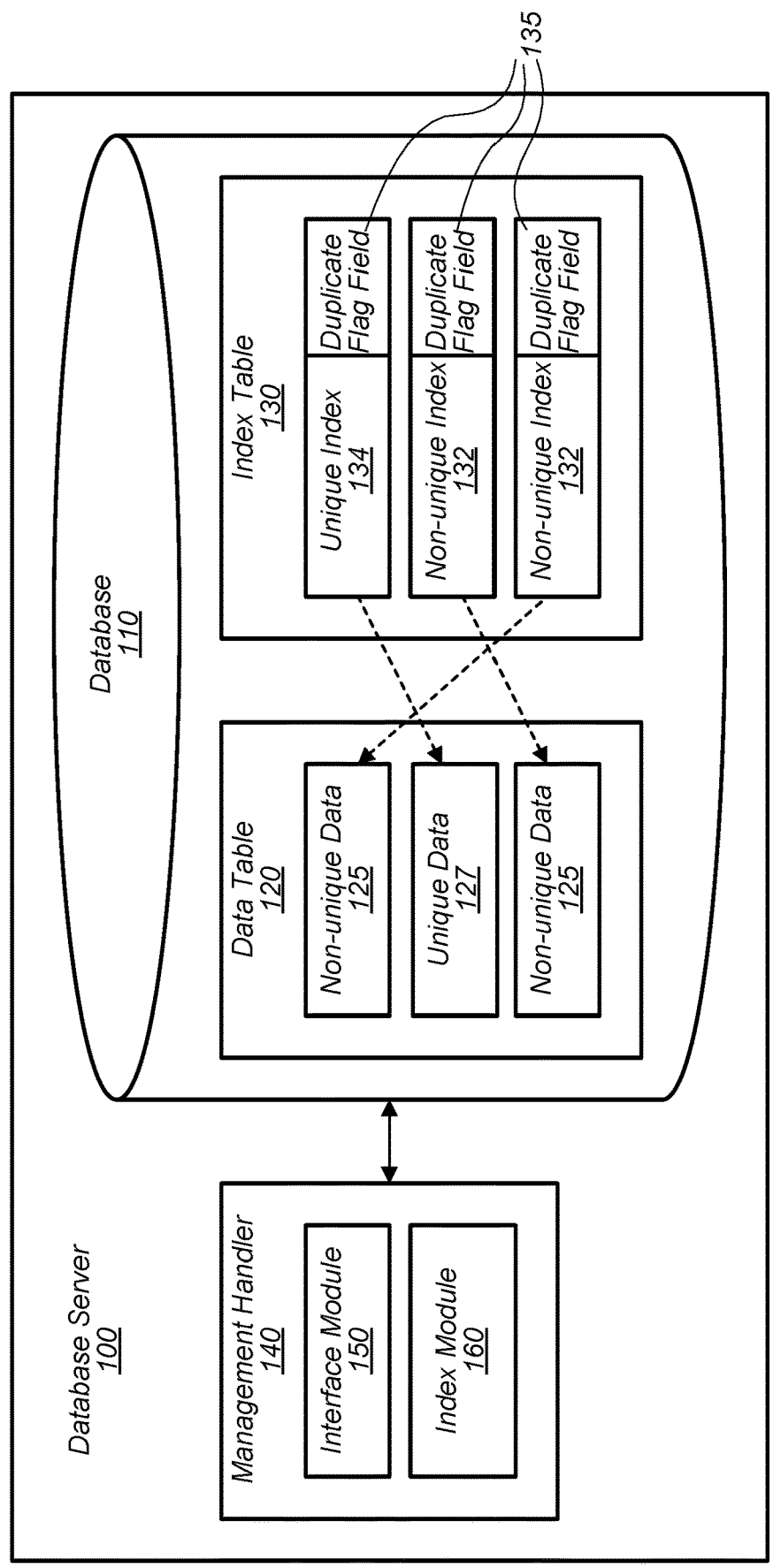
FIG. 1 is a block diagram illustrating exemplary elements of a system that facilitate the creation of an index table having both non-unique and unique index values, according to some embodiments.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated (e.g., no electrical power is currently being supplied to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in an index having eight index values, the terms "first" and "second" values can be used to refer to any two of the eight values. In other words, the first and second values are not limited to the initial two values of an index.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

To create an index based on the data stored in a field of a data table, the individual values of the data often have to be unique so that a system may retrieve the correct record for an index value supplied by a user. That is, if an index includes duplicate index values because the data for the field includes duplicate values, then the system may not know which index value corresponds to the desired record. As used herein, the term "field" refers to a portion of a database table that defines a set or grouping of the stored data. In various embodiments, a field corresponds to a column of database table, however, in some cases, a field might correspond to a row. The term "field" is not meant to refer to an individual record of a database table. For example, a database table may include fields for a username, a password, and an email and thus each record of the table may include a value corresponding to each of these fields. In some instances, the data stored in a field of a data table may include non-unique values (i.e., duplicates), which might result in an index table not functioning properly. For example, when a database system attempts to create an index for a last name field, the database system may throw an error when indexing both "John Smith" and "Eve Smith" since they both have the duplicate value of "Smith" for a last name.

The present disclosure recognizes that duplicate data values may be stored in a field of a data table and that problems may arise when attempting to create an index based on the duplicate data values. The present disclosure thus describes techniques for indexing duplicate data values and providing ways for addressing duplicate index values in an index. In one implementation, for example, a database system may use an index table that includes a duplicate value field for allowing and identifying duplicate index values stored in the index table. In response to receiving a request to index a field of a data table, a database system may analyze a subset of the data stored in the data table that corresponds to the particular field. Such an analysis may result in the database system determining that the subset of data includes one or more duplicate data values. Thus when inserting one or more duplicate index values, which are based on the duplicate data values, into an index table, the database system may provide an indication of each duplicate value (or for at least one duplicate value) using the duplicate value field. In one embodiment, before inserting a duplicate index value into an index table, the database system may allow the user to modify (or delete) the underlying duplicate data value in a manner that results in a unique data value. Such a modification may result in a unique index value that the database system may insert into an index table. In one embodiment, the user modifies the duplicate index value, which then propagates to the duplicate data value. In some embodiments, the database system may notify and allow the user to modify the duplicate index value (or duplicate data value) after its insertion into an index table. In this manner, a database system may index duplicate data values and provide a mechanism for allowing a user to correct such duplicate values.

Turning now to FIG. 1, a block diagram of one embodiment of a database server 100 is shown that facilitates the creation of an index table having both non-unique (i.e., duplicate) and unique index values corresponding to data of a particular field. Server 100 may further present non-unique values to a user and allow the user to modify these values in manner that results in uniqueness within the context of the particular field. In the illustrated embodiment, server 100 includes a database 110 and a management handler 140. Database 110 may store data for users of server 100 in data tables 120 and may further store an indexing of one or more fields of a particular data table 120 in index tables 130. Management handler 140 may include an interface module 150 that allows a user to communicate with server 100 and, in some cases, index module 160 for creating index table 130. In some embodiments, server 100 implements a multi-tenant database system (discussed with regards to FIGS. 7 and 8). Server 100 may further implement a relational database that organizes data into one or more tables of columns and rows with a unique key (e.g., a row ID) that identifies each row.

Data table 120, in one embodiment, is a data structure that stores data arranged in columns and rows in which each field (e.g., column) defines a set of the data for a series of records. For example, data table 120 may include fields for a username and an email along with several records (e.g., rows/entries) that include data for at least one of these fields. Table 120 may use a record to store non-unique data 125, unique data 127, or a combination thereof for a user of server 100. In the context of a particular field of table 120, unique data 127 refers to a value that appears only once in the particular field. In contrast, non-unique data 125 refers to a value that is duplicated within the particular field (i.e., appears two or more times in the particular field). References to "unique" and "non-unique" data are not meant to refer to entire records in data table 120.

In some cases, because data table 120 may be shared by numerous users (in other cases, only a single user), table 120 may store a large amount of data. Accordingly, searching for a certain record stored by table 120 may not be efficient since most of the records may have to be searched. In some embodiments, the records stored by data table 120 may be arranged in a manner that allows for more efficient searches, but in other embodiments, attempting to arrange the records stored by table 120 may not be desirable. First, in some instances, two or more users may have conflicting ways in which they want a given data table 120 to be arranged. As an example, table 120 may include a username field and an email field and one user may wish to sort table 120 based on the email field, while another user may wish to sort table 120 based on the username field. Second, even in cases where table 120 is utilized by a single user, that user may wish to search table 120 based on two or more fields, but sorting table 120 based on more than one field may not be possible. Using the last example, sorting table 120 based on the username field will, in most cases, cause the portion of the records associated with the email field to be out of order. Thus, in some embodiments, it may be desirable to create a table (e.g., an index table) based on a field of data table 120 that may be arranged in manner that allows for quick and efficient searches.

Index table 130, in one embodiment, is a data structure that stores index values corresponding to data values of a field of data table 120 and identifiers (or pointers) that indicate where (e.g., in which row) a record associated with an index value may be found in data table 120. As shown, the dotted lines indicate a correlation between the data of data table 120 and the index values of index table 130. That is, the dotted lines indicate the data that is being pointed to by the identifiers associated with the index values. In some embodiments, index table 130 stores non-unique index values 132, unique index values 134, or a combination thereof for users of server 100. A non-unique index value 132 may include a value for which a duplicate value may be found in the portion (e.g., field) of index table 130 that corresponds to the indexed field of data table 120. For example, data table 120 may store "John Smith" and "Eve Smith" and thus an indexing based on a last name field may result in two index values having the value "Smith"—both being a non-unique index value 132 since the other value exists. In contrast to non-unique index values 132, unique index values 134 may include a value for which no duplicate value may be found in the index field of index table 130. In various embodiments, multiple index tables 130 may be created for data table 120 where each index table corresponds to a different field of data table 120. In cases where multiple users wish to index data table 120 since table 120 may be shared, index table 130 may also be shared by multiple users.

Because index table 130, in various embodiments, stores index values for only a single field of data table 120, index table 130 may be arranged in a manner that allows for quick and efficient access of the data (e.g., records) of data table 120. For example, data table 120 may store a first and last name, a phone number, and an email address for many customers and a business owner may wish to access a record for a particular customer based on a last name field. Thus, an index table 130 may be created that includes index values that correspond to each last name. Server 100 may alphabetically sort these index values so that the index values (e.g., last names) that begin with an "A" appear at the beginning of the data structure. In response to receiving a request to find a record for "Washington," server 100 may not have to search all the index values of index table 130 instead server 100 may search the latter half of index table 130 for the index value corresponding to "Washington" and then use the identifier (or pointer) associated with that index value to retrieve the requested record. In various embodiments, however, data table 120 may store duplicate data values (e.g., non-unique data 125) for a field and thus indexing these duplicates data values may cause a system to throw an error since it may not be apparent which identifier to use when an index value supplied by a user maps to multiple index values (e.g., duplicate index values) of index table 130.

In some embodiments, index table 130 may include a duplicate flag field 135 that indicates that an index value is a non-unique index value 132. Field 135 may further indicate that data table 120 includes non-unique data 125. When inserting an index value into index table 130 that corresponds to a duplicate data value, server 100 may provide an indication using field 135 that the index value is non-unique with respect to at least one other index value in table 130.

When inserting duplicate index values in into table 130, there may be multiple ways to indicate that the index values are duplicates. In one embodiment, server 100 may not provide an indication using field 135 for the first duplicate index value inserted into table 130, but may provide indications for each subsequent duplicate index value inserted. That is, when inserting several duplicate index values into table 130, one of the duplicate index values may not be indicated as a duplicate. Thus, when searching for a record using an index value that happens to be a duplicate, server 100 may use field 135 to determine which one of the duplicate index values (stored in table 130) has not been flagged as a duplicate and thus use the pointer associated with that index value to retrieve the record. In another embodiment, server 100 may provide an indication for each duplicate index value inserted. In yet another embodiment, server 100 may provide an indication for some of the duplicates index values, but not all of them.

In various embodiments, server 100 may query index table 130 to retrieve the records that have duplicate data values using field 135 (e.g., retrieve records associated with index values that have been flagged) and present these duplicate data values to a user via an interface. Server 100 may also present the duplicate index values to a user.

Interface module 150, in one embodiment, facilitates communication between a user via a user device and server 100. In various embodiments, module 150 provides an interface to a user device that is operable to receive requests from a user and thus module 150 may receive a request via the interface to create an index table 130 based on a field of data table 120. In such embodiments, module 150 may instruct index module 160 to create index table 130 based on the requested field. During or after the creation of index table 130, module 150 may present an indication of any duplicate values to a user and allow the user to modify the duplicate values so that index table 130 includes only unique index values 134. When index table 130 includes non-unique index values 132, in one embodiment, module 150 receives an indication of which non-unique index value 132 to use in response to being supplied an index value for an operation such as a search operation. Module 150 may receive requests from a user to store additional records in data table 120 and thus may insert the additional records into data table 120 and instruct index module 160 to update index table 130. In one embodiment, the additional records include non-unique data 125 and thus module 150 may deny the request.

Index module 160, in one embodiment, facilitates the creation and modification of an index table 130 that is based on one or more fields of data table 120. Initially, index module 160 may receive, from a user via module 150, a request to create index table 130 based on a field of data table 120. In response to this request, module 160 may analyze a subset of the data of data table 120 that corresponds to the requested field to determine whether the subset of data includes non-unique data 125. In cases where a subset of data includes non-unique data 125, before inserting non-unique index values 132 into index table 130, module 160 may instruct interface module 150 to present any duplicate data values (e.g., non-unique data 125) to a user and allow the user the opportunity to resolve the duplicate data values (e.g., delete the data values, modify the data values, etc.). In some embodiments, module 160 may insert non-unique index values 132 into index table 130 and afterwards, instruct module 150 to present duplicates data values to the user. When inserting a duplicate index value into table 130, module 160 may modify the index value so that it is unique without consulting the user (the user may, in some instances, still be notified of the modification).

In various embodiments, a user may store additional records (or modify records) in data table 120 and thus module 160 may update index table 130 to reflect the additional records (or modified records). In some cases, if the additional records include duplicate data values, module 160 (or module 150) may reject the request to include corresponding index values in index table 130 and provide a notification to the user that the request has been denied (or cannot be serviced). That is, module 160 may enforce a unique constraint for records of the index table that are identified as unique index values 134 (in some cases, non-unique index values 132) by denying a request to insert a duplicate index value. Thus, application of a unique constraint for a particular field will, once an index table is created, prevent the existence of further duplicate values in that field. In other such cases, module 160 inserts the additional index values into index table 130 and provides an indication of each duplicate value using duplicate flag field 135.

Implementing database server 100 may improve indexing of non-unique and unique data. That is, server 100 may allow a user to create an index table that has both non-unique and unique index values and use such an index table to efficiently access records in a data table. Database server 100 may further advantageously present non-unique index values (or non-unique data values) to a user and allow the user to modify or delete the duplicate index values so that an index table may maintain a unique index constraint.

Turning now to FIG. 2A, an exemplary representation of one embodiment of data table 120 is shown. Note that the data tables disclosed in FIGS. 2A and 2B and the index table disclosed in FIG. 3 are included for illustrative purposes and are not intended to limit the scope of the present disclosure. In the illustrated embodiment, table 120 includes records 210 A-C and fields 220 for a first name, a last name, and an email. While FIG. 2A depicts table 120 as having three records and fields, table 120 may include any number of records 210 and fields 220. Table 120 may further store records that do not include data for all fields 220—e.g., a record includes only a last name. In various embodiments, this exemplary representation may be implemented in the context of a single user storing data in table 120, however, it is not limited to such a context.

As shown, some of fields 220 include a mixture of unique data (e.g., data 127) and non-unique data (e.g., data 125). For example, when indexing a field 220 of table 120, module 160 may determine whether the particular field includes unique data, non-unique data, or a combination thereof. For example, module 160 may receive a request to index data table 120 based on the first name field and thus may analyze a subset of the data stored by table 120 that is associated with the first name field (e.g., "Alex," "John," and "Aaron"). Based on the analysis of the subset, module 160 may determine that the subset does not include duplicate values (e.g., non-unique data 125). Because this subset does not include duplicate values, then with respect to indexing the first name field, data table 120 may be said to include only unique data 127. In other cases, module 160 may receive a request to index data table 120 based on the last name field and thus may analyze a subset of data associated with the last name field (e.g., "Smith," "White," and "Smith"). Based on this analysis, module 160 may determine that because this subset includes duplicates values, then with respect to indexing the last name field, table 120 may be said to include a mixture of unique data 127 (e.g., "White") and non-unique data 125 (e.g., "Smith").

Turning now to FIG. 2B, an exemplary representation of another embodiment of data table 120 is shown. In the illustrated embodiment, table 120 includes records 210 D-F and several fields 220 including an organization ID field 221, a key prefix field 222, a row ID field 223, and value fields 224A-C. In various embodiments, data table 120 may be implemented in the context of a multi-tenant database system and thus may store data for numerous users. Because table 120 may store data for numerous users, table 120 may include an organization ID field 211 that identifies the user(s) associated with each record stored by table 120. In this manner, when indexing table 120 for a user, module 160 may determine the relevant records that need to be analyzed and indexed. Table 120 may also include a key prefix field 222 that identifies table 120 to an index. That is, index table 130 may use the prefix field (since it also may include such a field) to determine which data table 120 is associated with the index values stored by table 130. For example, a data table 120 that stores data about customers may have a key prefix of a00, while a different table 120 that stores data about travel deals may have a key prefix of a01. Table 120 may also include a row ID field 223 that uniquely identifies the row in which a record is stored by table 120 and thus may be included in index table 130 as a pointer. That is, the data value that corresponds to row ID field 223 may be inserted into index table 130 in association with the index value that corresponds to the record that includes the data value. Thus, when an index value is searched for and found in index table 130, the corresponding pointer may be used to retrieve the requested record. As with data table 120 of FIG. 2A, data table 120 of FIG. 2B may include fields for storing data about a customer (e.g., value fields 224 A-C may correspond to a first name field, a last name field, and an email field).

Turning now to FIG. 3, an exemplary representation of one embodiment of index table 130 is shown. In the illustrated embodiment, table 130 includes records 210 and fields 220, which include a duplicate flag field 135. In some embodiments, duplicate flag field 135 is of a Boolean type that when set to 1 or true (in some cases, 0 or false) for record 210 indicates that the index value is a duplicate index value. Duplicate flag field 135, however, may be of another value type (e.g., a string, an integer, etc.). In various instances, in response to receiving a request to index data table 120 (e.g., data table 120 of FIG. 2B) based on a particular field (e.g., an email field), module 160 may create an index table similar to the one depicted in FIG. 3. As shown for example, table 130 includes three records having an email address for the index value field. While table 130 may be created in response to a request from a user, in various embodiments, module 160 may use an existing index table 130 that includes the same index value field. That is, two or more users indexing data tables 120 based on the same field may share index table 130. Thus, index table 130 may include an organization field (e.g., field 221) for identifying the records associated with a particular user. In some embodiments, table 130 does not include an organization ID field or key prefix field.

When inserting records (e.g., records 210, data that includes an index value, a unique row identifier, etc.) into index table 130, in various embodiments, module 160 determines 1) whether a particular record includes a duplicate index value and 2) whether another record with the same duplicate index value has been inserted into table 130. When a record includes a duplicate index value, which may be determined by analyzing data values stored in the field of data table 120, but no other record exists in index table 130 that has the duplicate index value, module 160 may insert the record into table 130. This insertion may be performed without setting the duplicate flag field 135 to indicate that the record is associated with a duplicate index value. For example as shown, the index value "amsith@example.com" appears twice, however, only one of the two values is flagged as a duplicate (e.g., "1"). In various embodiments, however, module 160 may set the duplicate flag field 135 to provide such an indication. When a record includes a duplicate index value and another record is present in table 130 that has the duplicate index value, module 160 may insert the record into table 130 and set the duplicate flag field 135 to indicate that the record is associated with a duplicate index value. As shown for example, one record includes an index value of "asmith@example.com," but the field 135 has not been set for that record (e.g., value of 0) and another record with the same index value has the field 135 set (e.g., value of 1). In some embodiments, module 160 may set the duplicate flag field 135 to indicate a duplicate for each duplicate index value inserted into table 130.

Figure 4:
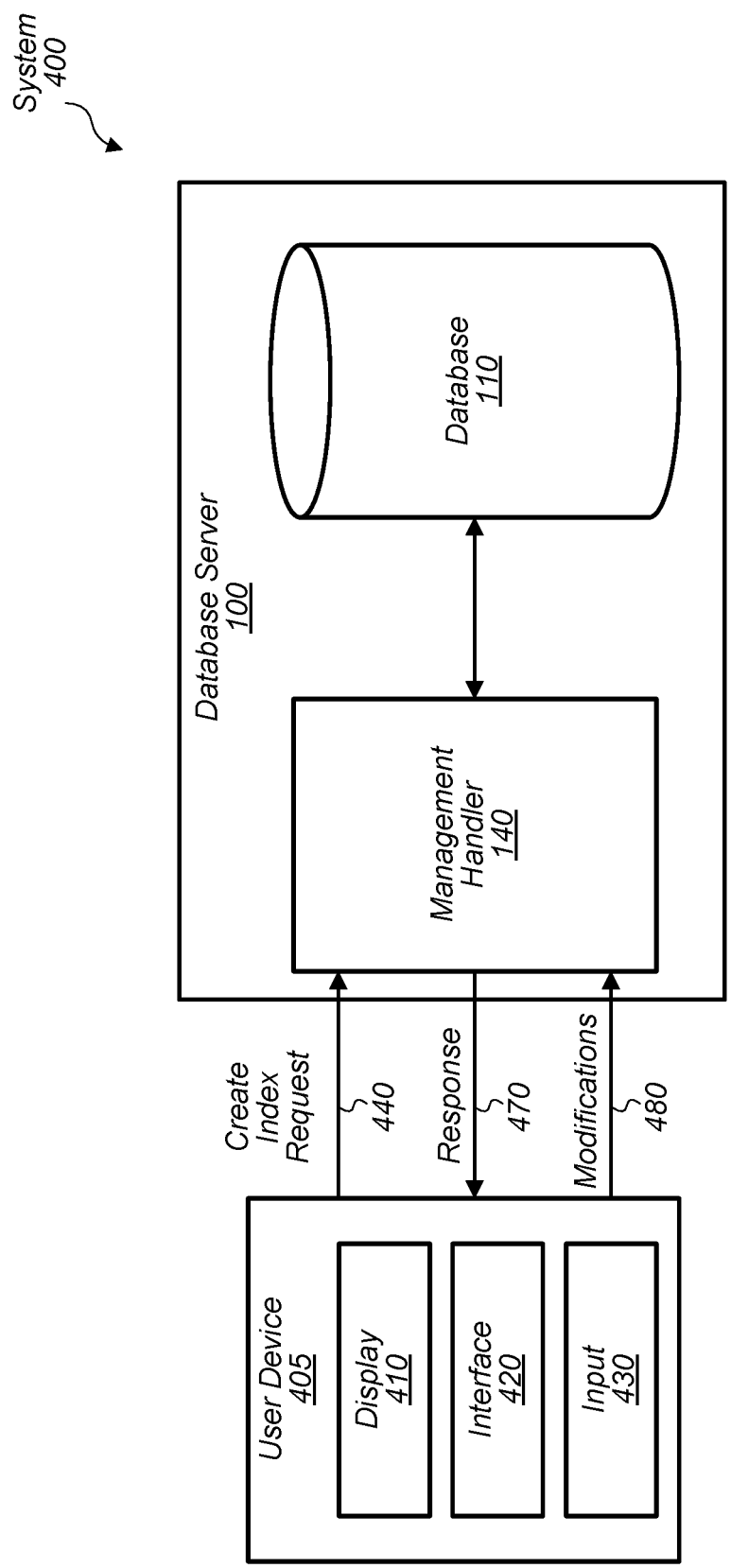
FIG. 4 is a block diagram illustrating exemplary elements of a system 400 that facilitate the creation of an index table having unique and non-unique index values that are based on a field of a data table, according to some embodiments

Turning now to FIG. 4, a block diagram of one embodiment of a system 400 is shown. In various embodiments, system 400 facilitates the creation (or modification) of index table 130 having non-unique and unique index values (e.g., index 132 and 134, respectively) that are based on a field of data table 120. In some embodiments, system 400 performs the indexing, but instead of creating a new index table 130, uses an existing table 130. As shown, system 400 includes a user device 405 having a display 410, an interface 420, and an input 430 and a database server 100 having a database 110 and a management handler 140. In various embodiments, database server 100 implements a multi-tenant database system configured to store a plurality of data tables 120 and index tables 130.

A user may initially wish to index data table 120 based on a field of the table and thus may use device 405 to send a request (e.g., create index request 440) to management handler 140 to perform the indexing. In various embodiments, interface 420 generates request 440 to include an identifier that specifies a field and a corresponding table 120 to be indexed and sends such a request to handler 140. In response to receiving request 440, handler 140 may look-up the particular table 120 indicated in the request and extract records associated with the requesting user to determine whether such records include duplicate values associated with the field specified in the request. In cases in which the records include duplicate values, handler 140 may send information detailing the duplicate values (e.g., response 470) to interface 420, which may provide the information to display 410 for presenting to the user. In various embodiments, however, handler 140 may insert duplicate index values into index table 130 and afterwards, provide response 470 to interface 420. Response 470 may include a suggestion of a modification to a duplicate value so that the duplicate value become a unique value. For example, if handler 140 determines that a duplicate last name "Smith" exists in data table 120, then handler 140 may suggest in response 470 that the user change "Smith" to "Smith_Dup." User device 405 may receive input from a user via input 430 and provide the input (e.g., modifications 480) to handler 140 for processing. Modifications 480 may include a request from the user to delete a record, modify a record, or perform some operation in relation to a record. In response to receiving modifications 480, handler 140 may perform the requested operation. As an example, handler 140 may receive a request from a user to modify a duplicate index value (or duplicate data value) so that it becomes unique. In response to receiving this request, handler 140 may modify the duplicate index value and update the corresponding value for field 135 to indicate the index value is unique.

After index table 130 has been created, in various embodiments, handler 140 may receive a request to locate a record based on an index value. In various embodiments, handler 140 may determine whether the index value is unique based on duplicate flag field 135. In cases where the supplied index value is unique, handler 140 may use the index value to determine the corresponding row identifier, which handler 140 may use to retrieve the requested record. In other embodiments, handler 140 returns multiple records associated with the duplicate index value.

Figure 5:
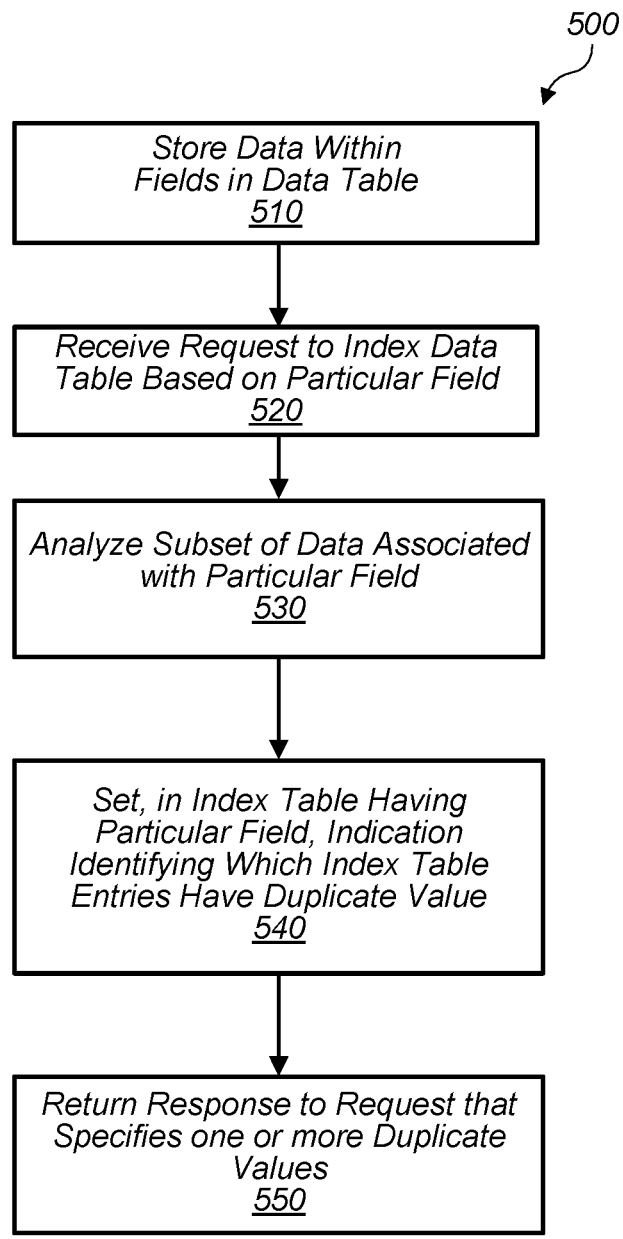
FIGS. 5 and 6 are flow diagrams illustrating exemplary methods for creating indexes based on a field of a data table.

Turning now to FIG. 5, a flow diagram of a method 500 for creating an index table based on a field of a data table is depicted. Method 500 is one embodiment of a method performed by a computer system such as database server 100 implementing a multi-tenant database. In many instances, performance of method 500 enables a user to efficiently access a particular record associated with a field. In some embodiments, method 500 may include more steps than shown such as presenting duplicate values (e.g., data 125 or 127) to a user, receiving a request to delete a duplicate value, etc.

Method 500 begins in step 510 with a computer system storing data for users within a plurality of fields in a data table (e.g., data table 120). In various embodiments, each of the plurality of fields includes a subset of the stored data. Each of these subsets of data may include non-unique data values (e.g., data 125), unique data values (e.g., data 127), or a combination thereof. Each field of the data table may correspond to a column of the data table and each row of the data table may correspond to a record of data values.

In step 520, the computer system receive a request (e.g., request 440) to index the data table based on a particular field (e.g., a field 220). In some embodiments, the request may be received from user via a user device (e.g., device 405) and include an indication of the data table to be indexed and the particular field to be used. In response to receiving the request, the computer system may retrieve a subset of data that is associated with the particular field.

In step 530, the computer system analyzes the subset of data to determine whether the subset includes one or more duplicate values (e.g., non-unique data 125). In various embodiments, in response to determining that duplicate values are present, the computer system presents the duplicate values to a user via an interface (e.g., provided by interface module 150) and allows the user to modify or delete the duplicate values before inserting corresponding index values into an index table. In one embodiment, the computer system presents the duplicate values after inserting them into an index table. When inserting index values into the index table, the computer system may also store an identifier (e.g., a row identifier/key similar to row ID 223) with each index value that uniquely identifies a row in the data table corresponding to the particular record.

In step 540, in response to determine that duplicate values are present in the subset of data, the computer system sets an indication (e.g., field 135) in an index table (e.g., index table 130) that identifies which entries (or records) of the index table have a duplicate value for the particular field. The indication may include a plurality of Boolean values that each correspond to a respective index value in the index table. In various embodiments, the computer system may enforce a unique constraint for entries of the index table that are identified by the indication to include unique values (or in some cases, duplicate values). Accordingly, in response to receiving a request to add an index value to the index table, the computer system may deny the request if the index value is a duplicate of another index value in an entry identified by the indication as including a unique value.

In step 550, the computer system returns a response (e.g., response 470) to the request that specifies the one or more duplicate values. In one embodiment, the response includes an interface operable to display the duplicate values to a user and provide a suggestion of a modification to at least one of the duplicate values so that it becomes unique. The computer system may receive, via the interface, a request to modify (or in some cases, delete) one or more of the duplicate values to have a unique value and thus the computer system may modify the duplicate values as requested and modify the indication of the index table for the entry that includes the duplicate value that has been modified. In various embodiments, the computer system may receive a request that includes an index value for retrieving a particular record. As such, the computer system may determine whether the index value corresponds to duplicate values and in response to determining that the value does, the computer system may return a plurality of records associated with the duplicate values. In some embodiments, the computer system may deny the request for retrieving the particular record until the duplicate values are resolved.

Figure 6:
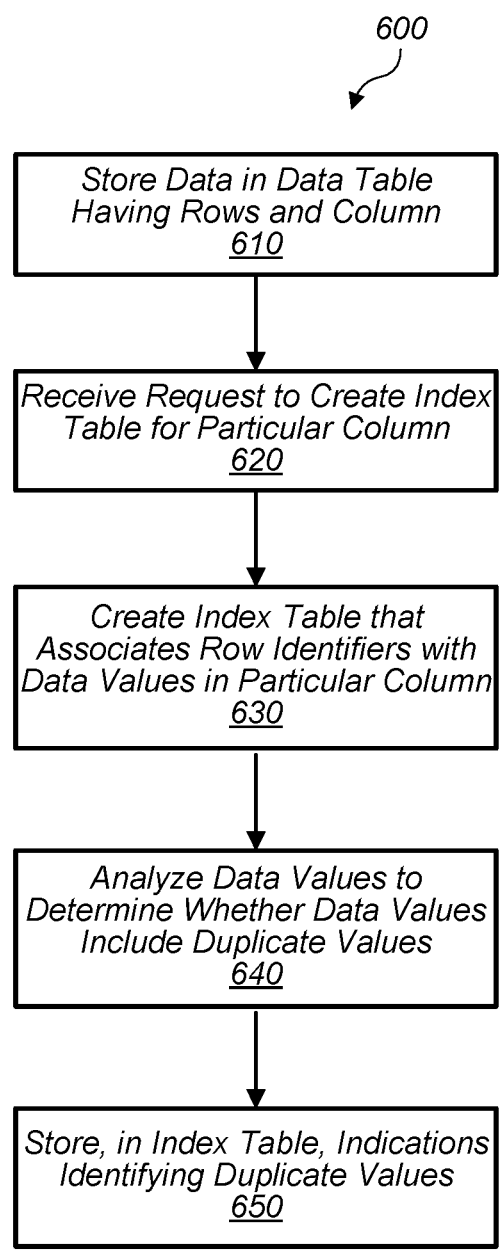

Turning now to FIG. 6, a flow diagram of a method 600 for creating an index table is depicted. Method 600 is another embodiment of a method performed by a computer system such as server 100, which may implement a relational database. In some instances, performance of method 600 allows creating of an index table from a column having non-unique data values.

Method 600 begins in step 610 with storing data in a data table (e.g., data table 120) having a plurality of rows (e.g., records 210) and a plurality of columns (e.g., fields 220). In step 620, a request (e.g., request 440) is recited to create an index table (e.g., index table 130) for a particular one of the plurality of columns. In some embodiments, the particular column corresponds to a custom field defined by one of a plurality of tenants having data stored in a relational database system, and the custom field is not usable by another of the plurality of tenants. In step 630, an index table is created that associates identifiers (e.g., row IDs 223) of ones of the plurality of rows with data values (e.g., values 224C) in the particular column. In step 640, the data values are analyzed to determine whether the data values include duplicate values. In step 650, in response to the analyzing identifying one or more duplicate values, one or more indications are stored in the created index table identifying the one or more duplicate values. In some embodiments, the index table includes a first column that includes the identifiers of the rows, a second column that includes the data values of the particular column, and a third column that includes the one or more indications. In some embodiments, method 600 further includes scanning the third column to determine which data values have been identified as being duplicate values and, based on the scanning, presenting an interface that indicates the data values identified as being duplicate values.

Exemplary Multi-Tenant Database System

Figure 7:
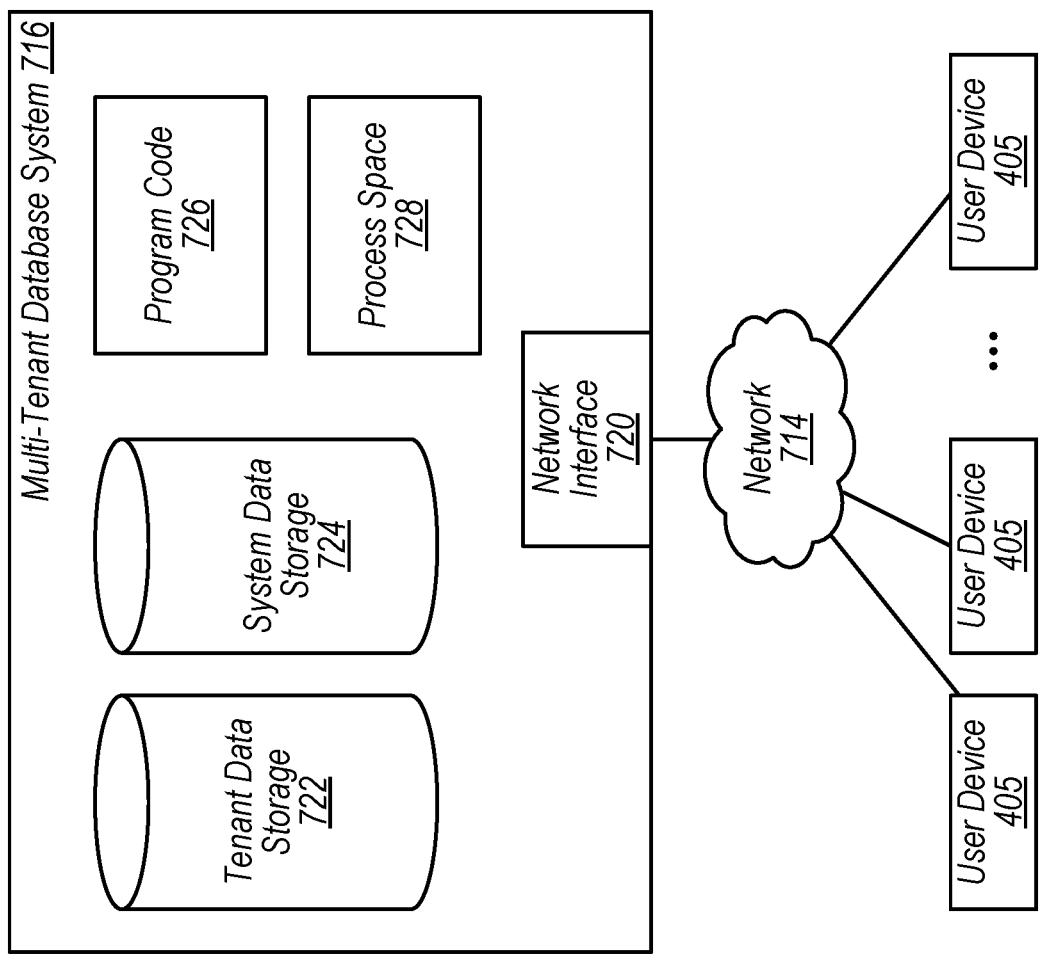
FIG. 7 is a block diagram illustrating an exemplary environment for a multi-tenant database system, according to some embodiments.

Turning now to FIG. 7, a block diagram of one embodiment of a multi-tenant database system is shown. Note that the disclosed multi-tenant systems are included to illustrative purposes but are not intended to limit the scope of the present disclosure. In other embodiments, similar techniques may be implemented in non-multi-tenant environments such as various client/server environments, cloud computing environments, clustered computers, etc. In various embodiments, multi-tenant database system (MTS) 716 implements database server 100 as disclosed above. As illustrated in FIG. 7 (and in more detail in FIG. 8) one or more user devices 405 may interact via a network 714 with MTS 716. The users of those user devices 405 may be clients in differing capacities and the capacity of a particular user device 405 might be determined by the current client. For example, when a salesperson is using a particular user device 405 to interact with MTS 716, that user device 405 may have the capacities allotted to that salesperson. However, while an administrator is using the same user device 405 to interact with MTS 716, it has the capacities allotted to that administrator.

Network 714 may be a LAN (local area network), WAN (wide area network), wireless network, point-to-point network, star network, token ring network, hub network, or any other appropriate configuration. The global internetwork of networks often referred to as the "Internet" with a capital "I," will be used in many of the examples herein and is one example of a TCP/IP (Transfer Control Protocol and Internet Protocol) network. It should be understood, however, that the networks that the present invention may utilize any of various other types of networks.

User devices 405 may communicate with MTS 716 using TCP/IP and, at a higher network level, use other common Internet protocols to communicate, such as HTTP, FTP, AFS, WAP, etc. As an example, where HTTP is used, user device 405 might include an HTTP client commonly referred to as a "browser" for sending and receiving HTTP messages from an HTTP server at MTS 716. Such a server might be implemented as the sole network interface between MTS 716 and network 714, but other techniques might be used as well or instead. In some implementations, the interface between MTS 716 and network 714 includes load sharing functionality, such as round-robin HTTP request distributors to balance loads and distribute incoming HTTP requests evenly over a plurality of servers. Preferably, each of the plurality of servers has access to the MTS's data, at least for the clients that are accessing a server.

In some embodiments, the system shown in FIG. 7 implements a web-based customer relationship management (CRM) system (e.g., database server 100). For example, in some embodiments, MTS 716 includes database servers 100 configured to implement and execute CRM software applications as well as provide related data, code, forms, web pages and other information to and from user device 405 and to store to, and retrieve from, a database system related data, objects and web page content. In embodiments of a multi-tenant system, tenant data is preferably arranged so that data of one tenant is kept separate from that of other tenants so that that one tenant does not have access to another tenant's data, unless such data is expressly shared.

One arrangement for elements of MTS 716 is shown in FIG. 7, including a network interface 720, storage 722 for tenant data, storage 724 for system data accessible to MTS 716 and possibly multiple tenants, program code 726 for implementing various functions of MTS 716 (e.g., functions of index module 160), and a process space 728 for executing MTS system processes and tenant-specific processes, such as running applications as part of an application service. In some embodiments, MTS 716 may store data tables 120 and index tables 130 in storage 722.

Several elements in the system shown in FIG. 7 may include conventional, well-known elements that need not be explained in detail here. For example, each user device 405 may be a desktop personal computer, workstation, laptop, PDA, cell phone, or any WAP-enabled device or any other computing device capable of interfacing directly or indirectly to the Internet or other network connection. User device 405 may execute an HTTP client, e.g., a browsing program, such as Microsoft's Internet Explorer™ browser, Netscape's Navigator™ browser, Opera's browser, or a WAP-enabled browser in the case of a cell phone, PDA or other wireless device, or the like, allowing a client (e.g., subscriber of a CRM system) of user device 405 to access, process, and view information and pages available to it from MTS 716 over network 714. Each user device 405 may include one or more user interface devices, such as a keyboard, a mouse, touch screen, pen or the like, for interacting with a graphical user interface (GUI) provided by the browser on a display monitor screen, LCD display, etc. in conjunction with pages, forms and other information provided by MTS 716 or other systems or servers. As discussed above, the present invention is suitable for use with the Internet, which refers to a specific global internetwork of networks. It should be understood, however, that other networks may be used instead of the Internet, such as an intranet, an extranet, a virtual private network (VPN), a non-TCP/IP based network, any LAN or WAN or the like.

In some embodiments, each user device 405 and its components are operator configurable using applications, such as a browser, that include computer code executable on one or more processing elements. Similarly, in some embodiments, MTS 716 (and additional instances of MTSs, where more than one is present) and their components are operator configurable using application(s) that include computer code executable on one or more processing elements. Thus, various operations described herein may be performed by executing program instructions stored on a non-transitory computer-readable medium and executed by one or more processing elements. The program instructions may be stored on a non-volatile medium such as a hard disk, or may be stored in any other volatile or non-volatile memory medium or device as is well known, such as a ROM or RAM, or provided on any media capable of staring program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C+, HTML, Java, JavaScript, or any other scripting language, such as VBScript.

According to one embodiment, each MTS 716 is configured to provide web pages, forms, applications, data, and/or media content to user device 405 to support the access by user device 405 as tenants of MTS 716. Furthermore, MTS 716 may provide security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, MTSs may include one or more logically and/or physically connected servers distributed locally or across one or more geographic locations. Additionally, the term "server" includes a computer system, including processing hardware and process space(s), and an associated storage system and database application as is well known in the art. It should also be understood that "server system" and "server" are often used interchangeably herein. Similarly, the databases described herein can be implemented as single databases, a distributed database, a collection of distributed databases, a database with redundant online or offline backups or other redundancies, etc., and might include a distributed database or storage network and associated processing intelligence.

Figure 8:
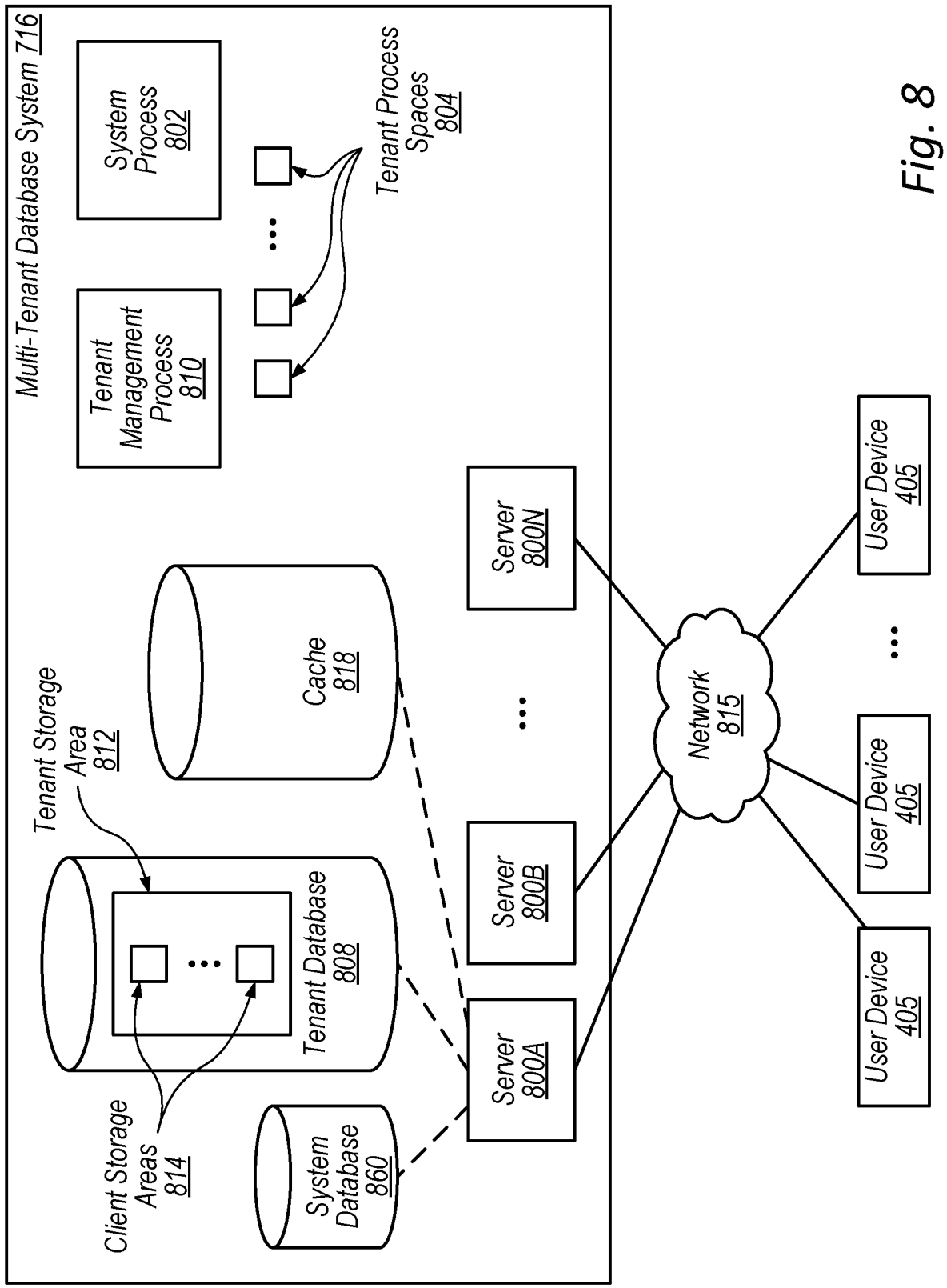
FIG. 8 is a block diagram illustrating an exemplary multi-tenant database system in more detail, according to some embodiments.

FIG. 8 illustrates exemplary embodiments of an MTS 716 and various interconnections in more detail. As noted above, in various embodiments, MTS 716 may implement database server 100. In this example, the network interface is implemented as one or more HTTP servers 800. Also shown is system process space 802 including individual tenant process spaces 804, a system database 806, tenant database(s) 808 and a tenant management process space 810. Tenant database 808 may be shared across application servers and may be divided into individual tenant storage areas 112, which can be either a physical arrangement or a logical arrangement. Database 808 may further store data for users in data tables 120 and index tables 130. Within each tenant storage area 812, client storage 814 might be allocated for each client.

In the illustrated embodiment, each server 800 also includes at least a portion of a cache 118. In some embodiments, user devices 405 that utilize web applications can request that data be stored in cache 118 (e.g., using a "put" operation) and later retrieve the data (e.g., using a "get" operation) rather than re-generating the data. In some embodiments, capacity limits may be assigned to different clients/users/tenants/partitions, etc. and cached data may be evicted in order to remain below the allotted capacity. In some embodiments, cached data for a particular tenant is kept private from other tenants. Further, the visibility scope for cached data within a particular tenant may be configurable.

In some embodiments, cache 818 is split across multiple servers 800. In some embodiments, splitting across multiple instances may allow the data in cache 818 to fit in system memory space, which may improve response times relative to storing data for cache 818 in disk storage, for example. As used herein, an "in-memory cache" is a cache that stores data in system memory space (which typically means that the data can be stored in RAM) rather than requiring paging for storage (as is typically required for traditional disc storage, for example). Cache 818 may also be a "multi-tenant" cache in the sense that a single cache is used to provide separate virtual caches for multiple different tenant entities. The different tenants may use the same data structure to store data or different tenants may have different data structures. In various embodiments, multi-tenant caches enforce data security between tenants such that data from one tenant is not available to other tenants. Thus, as used herein, the term "tenant" in the context of a multi-tenant cache refers to an entity for which cache entries are separately maintained such that different tenants cannot access each other's data. In some embodiments, tenants may authorize other tenants to access their data via the cache, while in other embodiments a given tenant's data may be accessible to only that tenant via the multi-tenant cache (although that tenant may subsequently share data retrieved from the cache, as that tenant desires).

It should also be understood that each server 800 may be communicably coupled to database systems, e.g., system database 806 and tenant database(s) 808, via, a different network connection. For example, one server 800$_1$ might be coupled via the Internet 815, another server 800$_{N-1}$ might be coupled via a direct network link, and another server 800$_N$ might be coupled by yet a different network connection. Transfer Control Protocol and Internet Protocol (TCP/IP) are preferred protocols for communicating between servers 800 and the database system, however, it will be apparent to one skilled in the art that other transport protocols may be used to optimize the system depending on the network interconnect used.

In preferred aspects, each server 800 is configured to handle requests for any client/user/organization. Because it is desirable to be able to add and remove servers from the server pool at any time for any reason, there is preferably no server affinity for a client/user and/or organization to a specific server 800. In one embodiment, therefore, an interface system (not shown) implementing a load balancing function (e.g., an F5 Big-IP load balancer) is communicably coupled between the servers 800 and the user devices 405 to distribute requests to the servers 800. In one aspect, the load balancer uses a least connections algorithm to route client requests to the servers 800. Other examples of load balancing algorithms, such as are round robin and observed response time, also can be used. For example, in certain aspects, three consecutive requests from the same client could hit three different servers, and three requests from different clients could hit the same server. In this manner, MTS 716 is multi-tenant, wherein the MTS 716 handles storage of different objects and data across disparate clients and organizations.

As an example of storage, one tenant might be a company that employs a sales force where each salesperson uses MTS 716 to manage their sales process. Thus, a client might maintain contact data, leads data customer follow-up data, performance data, goals and progress data, all applicable to that client's personal sales process (e.g., in tenant database 808). In some MTS embodiments, since all of this data and the applications to access, view, modify, report, transmit, calculate, eta, can be maintained and accessed by a user device having nothing more than network access, the client can manage his or her sales efforts and cycles from any of many different user devices. For example, if a salesperson is paying a visit to a customer and the customer has Internet access in their lobby, the salesperson can obtain critical updates as to that customer while waiting for the customer to arrive in the lobby.

While each client's sales data may be separate from other clients' sales data regardless of the employers of each client, some data may be organization-wide data shared or accessible by a plurality or all of the sales for a given organization that is a tenant. Thus, there may be some data structures managed by MTS 716 that are allocated at the tenant level while other data structures are managed at the client level. Because an MTS may support multiple tenants including possible competitors, the MTS should have security protocols that keep data, applications and application use separate. Also, because many tenants will opt for access to an MTS rather than maintain their own system, security, redundancy, up-time and backup are more critical functions and need to be implemented in the MTS.

In addition to client-specific data and tenant-specific data, MTS 716 might also maintain system level data usable by multiple tenants. Such system level data might include industry reports, news, postings, and the like that are sharable among tenants.

In certain aspects, user devices 405 communicate with servers 800 to request and update system-level and tenant-level data from MTS 716 that may require one or more queries to database system 806 and/or database system 808. In some embodiments, MTS 716 automatically generates one or more SQL statements (the SQL query) designed to access the desired information.

Each database may generally be viewed as a set of logical tables containing data fitted into predefined categories. Each table typically contains one or more data categories logically arranged in physical columns. Each row of a table typically contains an instance of data for each category defined by the columns. For example, a CRM database may include a table that describes a customer with columns for basic contact information such as name, address, phone number, fax number, etc. Another table may describe a purchase order, including columns for information such as customer, product, sale price, date, etc.

Exemplary Computer System

Figure 9:
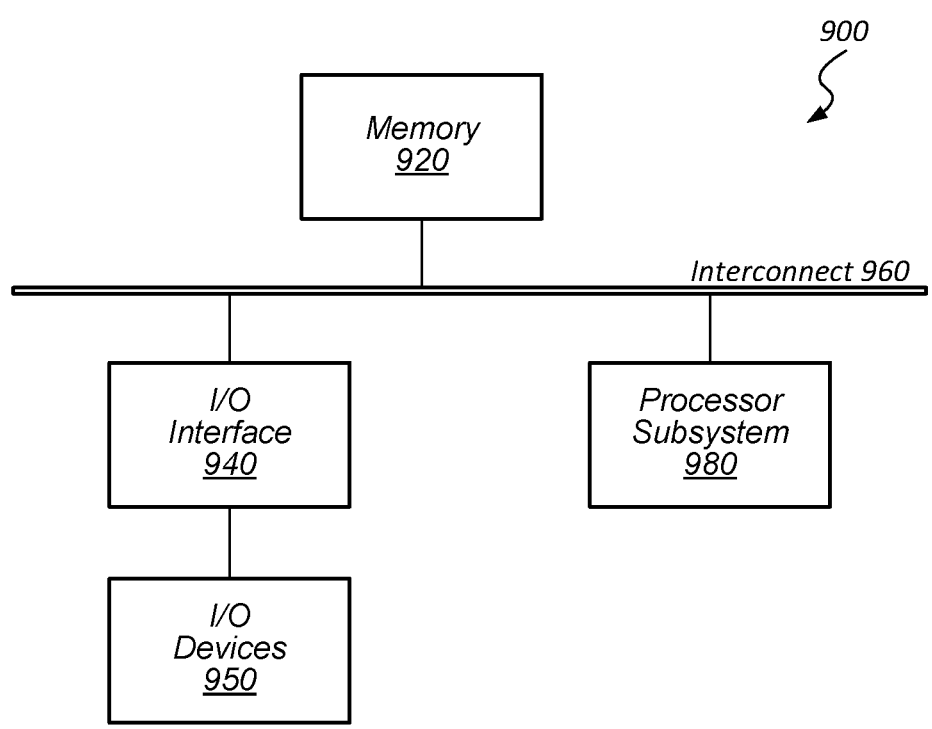
FIG. 9 is a block diagram illustrating an exemplary computer system, according to some embodiments.

Turning now to FIG. 9, a block diagram of an exemplary computer system 900, which may implement any of the various computer system disclosed herein, is depicted. Computer system 900 includes a processor subsystem 980 that is coupled to a system memory 920 and I/O interfaces(s) 940 via an interconnect 960 (e.g., a system bus). I/O interface(s) 940 is coupled to one or more I/O devices 950. Computer system 900 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 900 is shown in FIG. 9 for convenience, system 900 may also be implemented as two or more computer systems operating together.

Processor subsystem 980 may include one or more processors or processing units. In various embodiments of computer system 900, multiple instances of processor subsystem 980 may be coupled to interconnect 960. In various embodiments, processor subsystem 980 (or each processor unit within 980) may contain a cache or other form of on-board memory.

System memory 920 is usable store program instructions executable by processor subsystem 980 to cause system 900 perform various operations described herein. System memory 920 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 900 is not limited to primary storage such as memory 920. Rather, computer system 900 may also include other forms of storage such as cache memory in processor subsystem 980 and secondary storage on I/O Devices 950 (e.g., a hard drive, storage array, etc.). In some embodiments, these other forms of storage may also store program instructions executable by processor subsystem 980.

I/O interfaces 940 may be any of various types of interfaces configured to couple to and communicate with other devices, according to various embodiments. In one embodiment, I/O interface 940 is a bridge chip (e.g., Southbridge) from a front-side to one or more back-side buses. I/O interfaces 940 may be coupled to one or more I/O devices 950 via one or more corresponding buses or other interfaces. Examples of I/O devices 950 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 900 is coupled to a network via a network interface device 950 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A non-transitory, computer-readable medium having program instructions stored thereon that are capable of causing a database system to perform operations comprising:
- storing data for a plurality of fields in a data table, wherein a subset of the data is associated with a particular one of the plurality of fields;
- receiving, from a user of the database system, a request to index the data table based on the particular field;
- analyzing the subset of the data to create, for the data table, an index that indexes the subset of the data, wherein the data of the data table can be accessed via a set of pointers of the index, and wherein the index is separate from the data table; and
- in response to determining, based on the analyzing, that one or more duplicates of a particular value are present in the subset of the data:
  - storing the subset of the data, including the one or more duplicates of the particular value, in the index;
  - setting, in the index for a particular duplicate of the one or more duplicates, a flag to indicate that the particular duplicate is a duplicate value for the particular field; and
  - returning a response to the request to index that includes a user interface that is operable to display the one or more duplicates and enable the user associated with the request to make the one or more duplicates unique after having been stored in the index;
- receiving a record request to retrieve a record from the data table based on a first lookup value;
- in response to determining that the first lookup value corresponds to the one or more duplicates stored in the index, providing a notification that the record request cannot be serviced; and
- providing, via the user interface, a suggestion of a modification to at least one of the one or more duplicates to cause the at least one duplicate to have a unique value.

2. The computer-readable medium of claim 1, wherein the operations further comprise:
- receiving, via the user interface, a request to modify the particular duplicate to have a particular unique value; and
- in response to receiving the request to modify:
  - modifying the particular duplicate to have the particular unique value; and
  - setting the flag to indicate that the particular duplicate has become a non-duplicate value.

3. The computer-readable medium of claim 1, wherein the operations further comprise:
- receiving, via the user interface, a request to delete at least one of the one or more duplicates.

4. The computer-readable medium of claim 1, wherein the operations further comprise:
- receiving another record request to retrieve a particular record of the data based on a second lookup value;
- determining that the second lookup value is unique;
- using the second lookup value to determine a pointer associated with the second lookup value, wherein the pointer is usable to retrieve the particular record from the data table; and
- based on the pointer, returning the particular record.

5. The computer-readable medium of claim 4, wherein the particular field corresponds to a column in the data table, and wherein the pointer is a key that uniquely identifies a row in the data table corresponding to the particular record.

6. The computer-readable medium of claim 1, wherein the operations further comprise:
- enforcing a unique constraint for entries of the index that are identified to include unique values, wherein the enforcing includes:
  - receiving a request to add an index value to the index; and
  - denying the request to add the index value in response to determining that the index value is a duplicate of another index value in an entry identified as including a unique value.

7. The computer-readable medium of claim 1, wherein the data is stored for a first tenant of a plurality of tenants of the database system, and wherein the data of the first tenant is stored such that a second tenant of the plurality of tenants does not have access to the data.

8. A non-transitory, computer-readable medium having program instructions stored thereon that are capable of causing a database system to perform operations comprising:
- storing, for a first tenant of a plurality of tenants of the database system, information in a data table having a plurality of fields, each field including a respective subset of the information, wherein the information of the first tenant is stored such that a second tenant of the plurality of tenants does not have access to the information;
- receiving, from a user of the database system, a request to create an index from a subset of the information included within a particular one of the plurality of fields;
- creating a particular index having index values corresponding to the subset of the information associated with the particular field, wherein the particular index is separate from the data table;
- determining whether the index values include duplicate values;
- in response to determining one or more index values included in the particular index are duplicate values, setting, in the particular index, one or more flags to indicate that the one or more index values are duplicate values;
- presenting, to the user, an interface that presents the one or more index values and enables the user to modify the one or more index values to make the one or more index values unique after having been stored in the particular index;
- receiving a request to retrieve a particular record of the information, wherein the request to retrieve includes an index value associated with the particular record;
- in response to determining that the index value corresponds to a duplicate value, providing a notification that the request to retrieve cannot be serviced; and providing, via the interface, a suggestion of a modification to at least one of the one or more index values to cause the at least one index value to have a unique value.

9. The computer-readable medium of claim 8, wherein the operations further comprise:
   subsequent to creating the particular index, receiving a request to insert a new value into the subset of the information associated with the particular field;
   based on the one or more flags, determining that the new value is a duplicate value; and
   providing a notification that the request to insert has been denied.

10. The computer-readable medium of claim 8, wherein the operations further comprise:
    receiving an indication that the one or more index values have been modified to become unique; and
    in response to receiving a further request to retrieve the particular record, returning the particular record.

11. The computer-readable medium of claim 8, wherein the data of the data table can be accessed via a set of pointers of the particular index.

12. A method, comprising:
    a relational database system storing data in a data table having a plurality of rows and a plurality of columns;
    the relational database system receiving, from a user of the relational database system, a request to create an index for a particular one of the plurality of columns;
    the relational database system creating an index, for the data table, that associates identifiers of ones of the plurality of rows with data values in the particular column, wherein the data of the data table can be accessed via the identifiers of the index, and wherein the index is separate from the data table;
    the relational database system analyzing the data values to determine whether the data values include duplicate values;
    in response to the analyzing identifying one or more duplicate values, the relational database system setting, in the created index, one or more flags corresponding to the one or more duplicate values to identify the one or more duplicate values, wherein the one or more duplicate values are stored in the created index;
    the relational database system presenting, via a user interface, the one or more duplicate values to the user to enable the user to make the one or more duplicate values unique after having been stored in the created index;
    the relational database system receiving a record request to retrieve a record from the data table based on a first lookup value;
    in response to determining that the first lookup value corresponds to the one or more duplicate values stored in the index, the relational database system providing a notification that the record request cannot be serviced; and
    the relational database system providing, via the user interface, a suggestion of a modification to at least one of the one or more duplicate values to cause the at least one duplicate value to have a unique value.

13. The method of claim 12, wherein the created index includes a first column that includes the identifiers of the rows, a second column that includes the data values of the particular column, and a third column that includes the one or more flags.

14. The method of claim 13, further comprising:
    scanning the third column to determine which data values have been identified as being duplicate values; and
    based on the scanning, presenting an interface that indicates the data values identified as being duplicate values.

15. The method of claim 12, wherein the particular column corresponds to a custom field defined by one of a plurality of tenants having data stored in the relational database system, and wherein the custom field is not usable by another of the plurality of tenants.

* * * * *